J. G. MORGAN.
APPARATUS FOR FEEDING LIME TO BLAST FURNACES.
APPLICATION FILED NOV. 3, 1913.
1,137,415.
Patented Apr. 27, 1915.
2 SHEETS—SHEET 2.
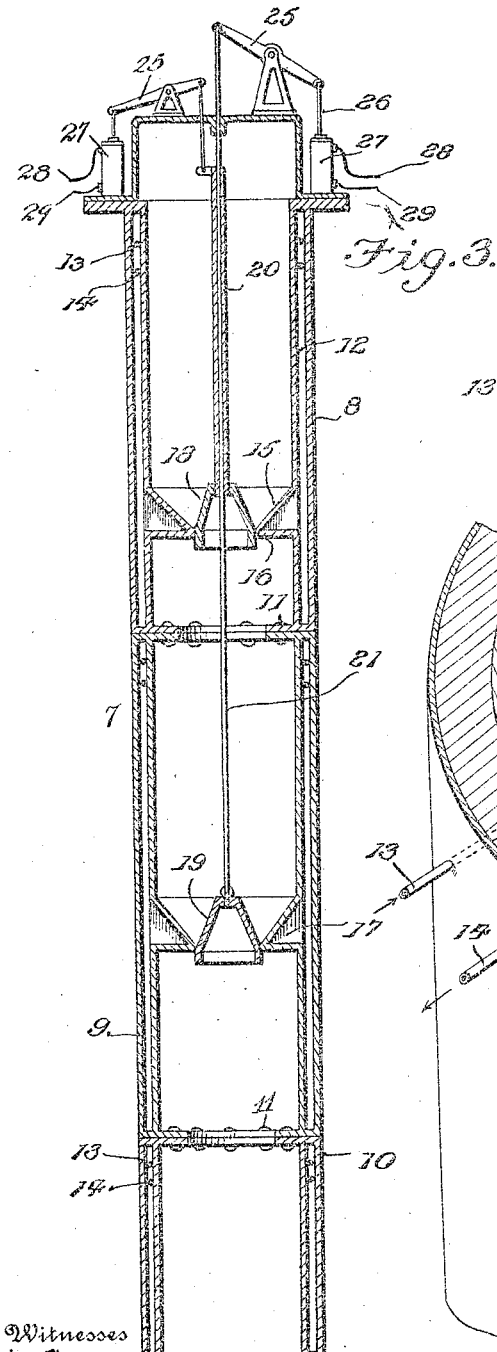
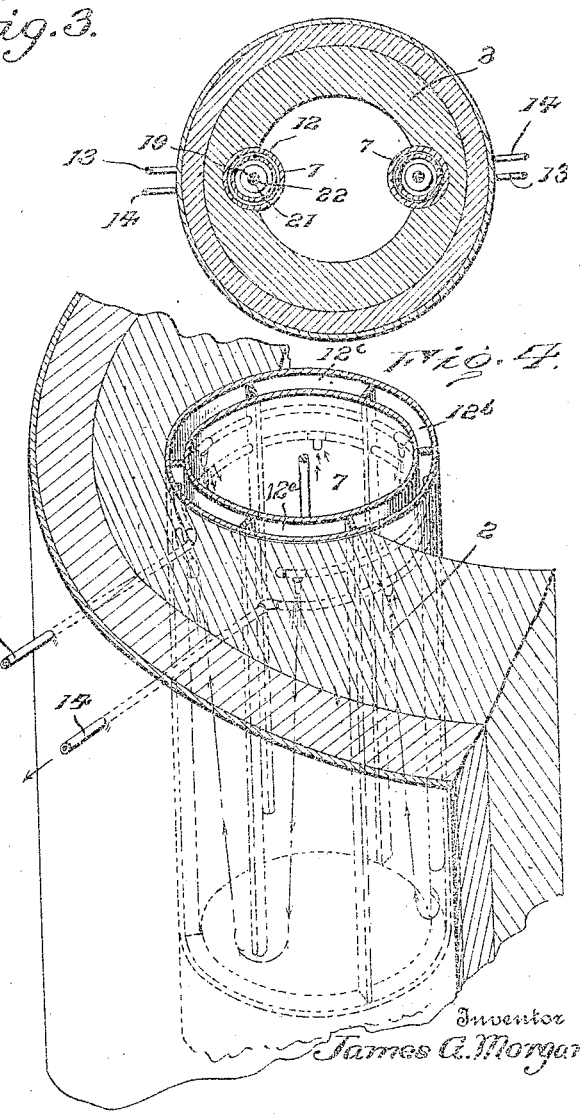

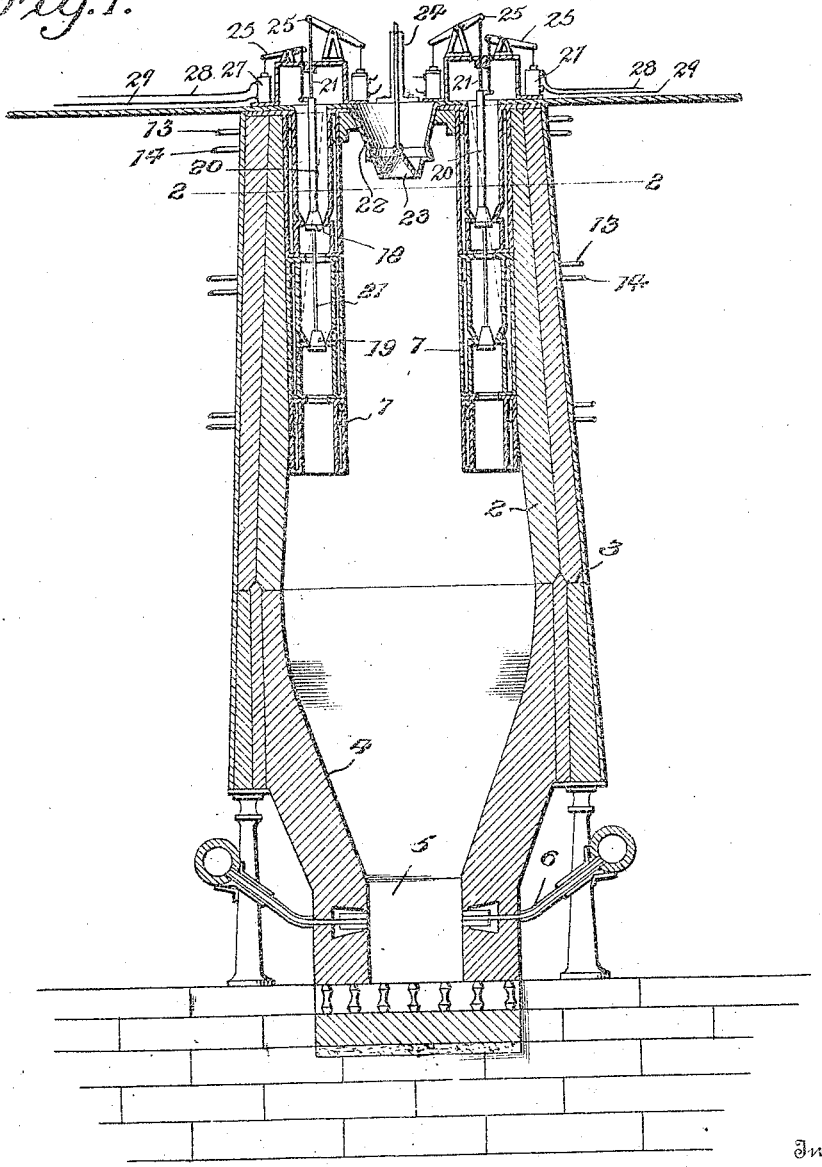

UNITED STATES PATENT OFFICE.

JAMES G. MORGAN, OF JACKSON, OHIO.

APPARATUS FOR FEEDING LIME TO BLAST-FURNACES.

1,137,415.  Specification of Letters Patent.  Patented Apr. 27, 1915.

Application filed November 3, 1913. Serial No. 799,000.

*To all whom it may concern:*

Be it known that I, JAMES G. MORGAN, citizen of the United States, residing at Jackson, in the county of Jackson and State of Ohio, have invented certain new and useful Improvements in Apparatus for Feeding Lime to Blast-Furnaces, of which the following is a specification.

My invention relates to blast furnaces, and particularly to means whereby lime may be fed into the shaft of the furnace and properly distributed therein. The use of lime in the form of calcium oxid (CaO) in a blast furnace for fluxing purposes has for many years been recognized as theoretically having a great advantage over the use of limestone, calcium carbonate ($CaCO_3$). This theory is based on the fact that in calcium oxid which is made from limestone, the carbon dioxid ($CO_2$) is driven off outside of the furnace. When limestone in the form of calcium carbonate is charged in at the top of the furnace, it begins to decompose at about 1100° Fahr., and gives off carbon dioxid. The decomposition is complete at about 1600° Fahr. and practically all of the carbon dioxid has been driven off from the stone, leaving calcium oxid or lime. The carbon dioxid gas passing upward through the stock, comes in contact with the coke of the charge and extracts an amount of carbon from the coke equal to that contained in the carbon dioxid gas and forms carbon monoxid (CO). In pure limestone this loss of coke amounts to about 14 lbs. of coke to every 100 lbs. of limestone used, but for the limestone generally used in most furnaces, the loss of coke will amount to about 12 lbs. to every 100 lbs. of limestone used. The charging of lime in the form of calcium oxid into the top of the furnace would seem to overcome this loss of carbon, inasmuch as the carbon dioxid has been driven off outside of the furnace before it is introduced, but as the calcium oxid sinks down in the furnace with the stock it comes in contact with the carbon dioxid gas formed by the reduction of the ores by the carbon monoxid gas, and comes in contact with this carbon dioxid at temperatures at which the calcium oxid has a strong affinity for the carbon dioxid. The following reaction therefore takes place: $CaO + CO_2 = CaCO_3$, that is, the lime is again turned into limestone (calcium carbonate) by the addition of the carbon dioxid which is later released again farther down in the furnace and ascending through the stock comes in contact with the coke, thereby causing a loss by absorption of carbon in the manner heretofore explained.

The primary object of my invention, therefore, is to obviate this loss of carbon and to accelerate other reactions and conditions conducive to good furnace practice, by introducing lime into the furnace at a point where practically no carbon dioxid gas exists.

A further object of the invention is to provide means for introducing lime into a furnace stack so formed that the gas in the furnace will not escape while the lime is being introduced.

A further object of the invention is to so construct this means for introducing lime that a sufficient clearance for the stock as it rolls off the furnace bell will be provided.

Other objects will appear in the course of the following description.

My invention is illustrated in the accompanying drawings wherein:

Figure 1 is a vertical diametrical section of a blast furnace constructed in accordance with my invention. Fig. 2 is a section on the line 2—2 of Fig. 1. Fig. 3 is a longitudinal vertical section of one of the lime chutes with its valves. Fig. 4 is a fragmentary perspective view of one of the lime chutes illustrating the arrangement of water inlet and outlet pipes.

Corresponding and like parts are referred to in the following description and indicated in all the views of the accompanying drawings by the same reference characters.

Referring to these drawings, 2 designates the shaft of a blast furnace of any ordinary construction. My invention is not limited to any particular form of blast furnace and therefore I wish it understood that the illustration of the blast furnace used by me is very largely diagrammatic. The interior diameter of the shaft gradually enlarges downward a certain portion of its length to the bosh 3 and then is contracted as at 4 and opens into the well 5 into which open the twyers 6.

Extending downward from the mouth of the furnace to any desired or suitable extent are a plurality of chutes, each chute being designated generally 7. All of the chutes have the same form and hence a description of one chute with its valve arrangement will apply to all of the chutes. As illustrated in Fig. 3, each chute is preferably formed of three sections of pipe or tubing designated 8, 9 and 10. Each section is preferably inwardly flanged at one or both ends so that the sections may be joined to each other by means of bolts or rivets 11. Each section may be water jacketed, the wall being double to provide the water space 12. Preferably the water space of each jacket is divided into a plurality of compartments $12^a$, $12^b$, $12^c$, each compartment having an induction pipe 13 and an outlet pipe 14 to provide for the circulation of cold water. Each compartment is formed with a vertical partition extending nearly to the bottom of the compartment, the inlet for that compartment being on one side of the partition while the outlet pipe is on the opposite side. The water is admitted by the pipe at the top of the compartment then it passes down the compartment and crosses over to the bottom of the compartment on one side of the partition and passes up and is discharged at the top thus securing a circulation of water within each compartment. Of course, I do not wish to be limited to the precise construction of this jacket 12 or its subdivision into water spaces.

The section 8 of the chute is formed with a valve seat 15 on its inner face, this valve seat being downwardly and centrally extended to provide a central opening 16. The section 9 is also provided with a like valve seat 17. Co-acting with the valve seat 15 is the inverted bell-shaped valve 18 which fits the central opening 16, and co-acting with the valve seat 17 is the inverted bell-shaped valve 19. The valve 18 is attached to a tubular rod 20 while the valve 19 is attached to a rod 21 which extends upward through the tubular rod. Thus the valves 18 and 19 have independent movement.

The center of the shaft 2 is provided with the usual hopper 22 controlled by the usual inverted cone-shaped valve or bell 23. This valve or bell 23 is intended to be operated by means of any usual mechanism for this purpose, this mechanism being indicated in Fig. 1 by the reference numeral 24. It is to be understood, of course, that a suitable operating rig is also to be used for opening or closing the valves 18 and 19, said rig to be placed at a convenient point at the top of the shaft and to be operated by steam, compressed air, or any other of the usual instrumentalities. The rig for operating these valve rods 21 and 22 will be of very much the same form as the mechanism used for operating double bells on blast furnaces. Such a rig is illustrated in Figs. 1 and 3. Each valve is controlled by its own rig which includes a walking beam 25 to which one end of the valve rod is connected. A piston rod 26 is connected to the other end of the walking beam and leads to a piston operating in a steam cylinder 27. Steam is supplied to this cylinder through either the pipe 28 or 29 according to the desired direction of movement of the piston. It is obvious that as each furnace has conditions peculiar to itself, the operating mechanism for actuating the valves will be arranged to suit the particular necessity of each furnace. It is to be noted that the chutes 7 are disposed partly in the wall of the shaft 2 as illustrated in Fig. 2 so as to admit of sufficient clearance for stock as it rolls off the furnace bell.

The bells or valves in the chutes are to be operated as follows: Lime is discharged into the first division or chamber 8. Then the valve or bell 18 by which it is retained is lowered allowing the lime to pass into the second division or chamber whose valve 19 at this time is closed. The valve 18 is then raised to close the opening 16 and the valve 19 is lowered, allowing the lime to pass on into the furnace. The upper bell or valve 18 remains closed during this operation in order to prevent the escape of gases.

It will be noted that the chutes extend down far enough into the shaft to discharge lime into the furnace at a point where practically no carbon dioxid gas exists. The advantages of the invention are as follows:—First, it will effect a saving in fuel of from twelve to fourteen pounds of coke to every hundred pounds of limestone used. Second, by use of my invention, lime may be used, and by using lime instead of limestone an additional saving of fuel is secured, due to a decreased volume of gas escaping from the furnace as this gas has already been driven off the limestone outside of the furnace in the process of converting the limestone into lime. Third, an additional saving in fuel will be secured due to a decreased volume of gas escaping from the furnace top as a result of a decreased requirement for air. Fourth, a further fuel saving will be secured, due to a decreased rate of travel of the gases passing through the stock. Fifth, inasmuch as the upper portion of the stock will be in cooler condition, an additional saving of fuel will be secured. Sixth, my invention will increase the output of iron because of the larger proportion of iron bearing material in each charge. This is due to the fact that when a fixed amount of limestone $CaCO_3$, is reduced to lime, CaO, it occupies less space, and as this space is of necessity taken up by other materials, largely iron bearing materials, it follows that output of iron will necessarily be increased. Seventh, it will effect an additional increase and output of iron and a saving in fuel due to conditions secured by the use of my invention, both chemical and physical, which produce good smelting conditions.

It will be apparent that the machinery and equipment will not be subjected to as great an amount of work per ton of iron when lime is used, instead of limestone, and the lime is discharged into the furnace at the point indicated. This will insure a steadier run, less breakage, and thereby cause an increase in the output of iron and likewise a saving in fuel which such steady operation always produces.

While I have illustrated what I believe to be a thoroughly effective form of my apparatus, I wish it understood that I need not be limited to this as the specific construction of the chutes, the manner of operating the bells, etc., may be varied to suit any desired condition.

What I claim is:

1. In a blast furnace, a chute of straight line extent projecting vertically downward from the upper end of the furnace, being located wholly therein and being open at its lower end, the lower end being on a level above the zone of fusion and below the zone where carbon dioxid gas exists.

2. In a blast furnace whose walls incline downward and outward to the bosh and then downward and centrally, a chute extending straight downward from the upper end of the furnace and disposed against the inner face of the wall of the furnace, said chute being open at its lower end, the mouth of the chute being disposed above the zone of fusion.

3. In a blast furnace, a chute located interiorly of the furnace extending downward from the upper end of the furnace and opening at its lower end, the lower end being on a level above the zone of combustion and below the zone where carbon dioxid gas exists.

4. In a blast furnace, the inner face of whose walls extends downward and outward to the bosh, a chute, located interiorly of the furnace extending straight downward from the upper end of the furnace and disposed at its upper end partially in the furnace wall and with its lower end wholly within the furnace and clear of the wall.

5. In a blast furnace, a chute located within the furnace extending downward from the upper end of the furnace and disposed against the inner face of the wall thereof, the chute terminating short of the bosh and being adapted to discharge matter out of contact with the wall.

6. In a blast furnace, a chute located within the furnace extending straight downward from the mouth of the furnace and disposed against the inner face of the wall thereof, the lower end of the chute being open, and a plurality of valves in each chute controlling the passage of material through the chute and the upward passage of gases through the chute.

7. The combination with a blast furnace, of a chute for introducing lime or other material into the furnace, said chute extending straight downward from the top of the furnace and being disposed against the inner face of the wall thereof, said chute being formed in a plurality of sections, and independently operated valves spaced from each other and controlling the passage of material through said chute.

8. In a blast furnace, a plurality of chutes for introducing lime or other material into the furnace, said chutes being disposed against the inner face of the wall of the furnace and extending straight downward and discharging at their lower ends above the bosh.

In testimony whereof I affix my signature in presence of two witnesses.

JAMES G. MORGAN. [L. S.]

Witnesses:
  GEO. J. JONES,
  JOHN A. ROSSER.